(12) United States Patent
Maguire

(10) Patent No.: US 8,061,144 B1
(45) Date of Patent: Nov. 22, 2011

(54) GAS TURBINE ENGINES

(75) Inventor: Addison Charles Maguire, Alvaston (GB)

(73) Assignee: Rolls-Royce Limited, London (GB)

( * ) Notice: Subject to any disclaimer, the term of this patent is extended or adjusted under 35 U.S.C. 154(b) by 0 days.

(21) Appl. No.: 05/886,537

(22) Filed: Mar. 2, 1978

(30) Foreign Application Priority Data

Mar. 5, 1977 (GB) .................................. 09386/77

(51) Int. Cl.
*F02K 3/10* (2006.01)
*F02K 1/38* (2006.01)
*F02K 1/46* (2006.01)

(52) U.S. Cl. ............... 60/765; 60/749; 60/262; 60/266

(58) Field of Classification Search ................. 60/765, 60/761, 749, 262, 264, 266, 261, 39.72 R; 239/265.17, 265.19
See application file for complete search history.

(56) References Cited

U.S. PATENT DOCUMENTS

| | | | | |
|---|---|---|---|---|
| 3,118,276 A | * | 1/1964 | Keenan et al. | 60/262 |
| 3,698,186 A | * | 10/1972 | Beane et al. | 60/261 |
| 4,134,260 A | * | 1/1979 | Lefebvre et al. | 60/261 |

* cited by examiner

*Primary Examiner* — Timothy D Collins
*Assistant Examiner* — Joseph W Sanderson
(74) *Attorney, Agent, or Firm* — Oliff & Berridge, PLC

(57) ABSTRACT

In a by-pass gas turbine engine having a lobed type by-pass air and turbine exhaust mixer unit, the reheat gutters are arranged in the mixer in the turbine exhaust duct. The gutters extend radially and are substantially Y-shaped, each of the two legs of the Y extending radially along the sides of a mixer lobe.

6 Claims, 2 Drawing Sheets

GAS TURBINE ENGINES

Figure 1:
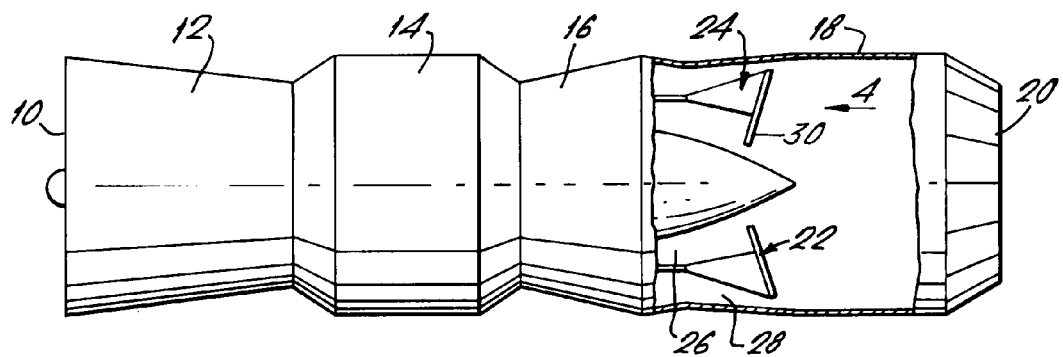

This invention relates to gas turbine engines.

It is usual for gas turbine engine which are intended for use in aircraft designed to fly at very high or supersonic speeds to provide means to significantly increase the thrust of the engine when such high or supersonic speeds are required.

This is normally achieved by augmenting the thrust of the engine with a reheat system. After the combustion gases are discharged from the gas turbine into the jet pipe of the engine, some additional thrust potential remains, since not all of the available oxygen has been consumed. Since such a system uses an extra fairly large fuel flow, the system is not normally used continuously, but only for relatively brief periods of time, so that considerable amounts of fuel need not be carried and/or the range of the aircraft is not substantially reduced.

A typical reheat system consists of a series of annular channel-shaped gutters arranged at the upstream end of the jet pipe, and an array of fuel supply manifolds located immediately upstream of the gutters. The gutters serve to stabilise the flame formed in the jet pipe when the fuel flow is initiated and the resulting fuel/gas mixture ignited.

A gas turbine engine with a reheat system usually has a rather long jet pipe to accommodate the system and this of course means extra weight.

A reheat system can be applied to gas turbine engines either with or without a by-pass duct and in the case of an engine with a by-pass duct, the mixing of the turbine exhaust gases and the cooler by-pass air usually takes place before the reheat system. Thus such an engine can have an even longer jet pipe than a non-bypass engine.

It is an object of the present invention to provide a reheat system for a gas turbine engine of the by-pass type which will enable a shorter, and hence lighter jet pipe to be used.

According to the present invention a gas turbine engine of the by-pass type having a turbine exhaust gas and by-pass air mixer of the lobed type is provided with a reheat system comprising a plurality of gutters arranged radially within the turbine exhaust duct, the gutters extending into the lobes of the mixer, a portion of the wall of each lobe forming at least a portion of each gutter.

Preferably each gutter comprises a radially inner part, and a radially outer part, the radially inner part having a substantially channel-shaped section and the radially outer part comprising a portion of the wall of the lobe and a portion of channel-shaped section.

Preferably each gutter consists of a flame stabilising portion and a wall portion spaced from the flame stabilising portion as described and claimed in the co-pending U.S. application Ser. No. 886,070 of Maquire filed Mar. 2, 1979.

Each gutter may have a substantially Y-section, the two legs of the Y-section extending into adjacent lobes of the mixer and being attached to the walls of the lobes.

Figure 2:
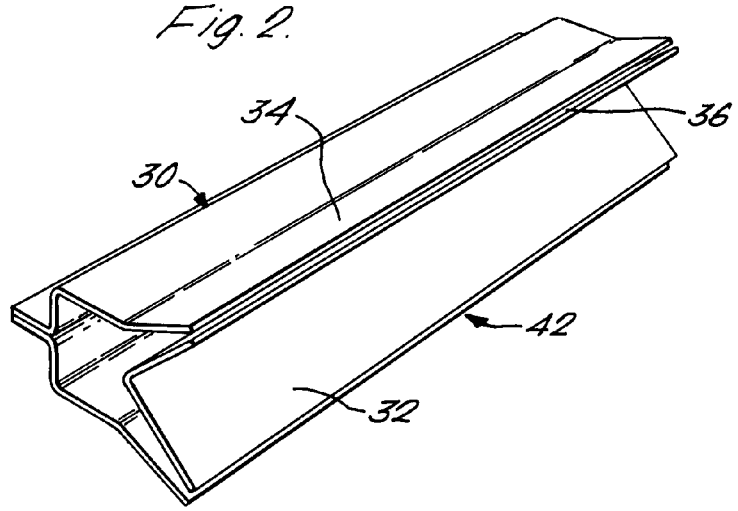
Figure 3:
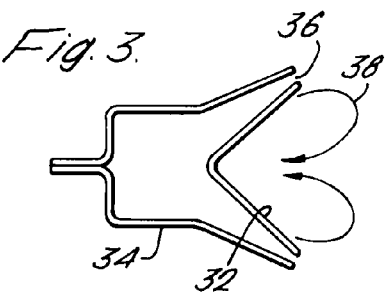
Figure 4:
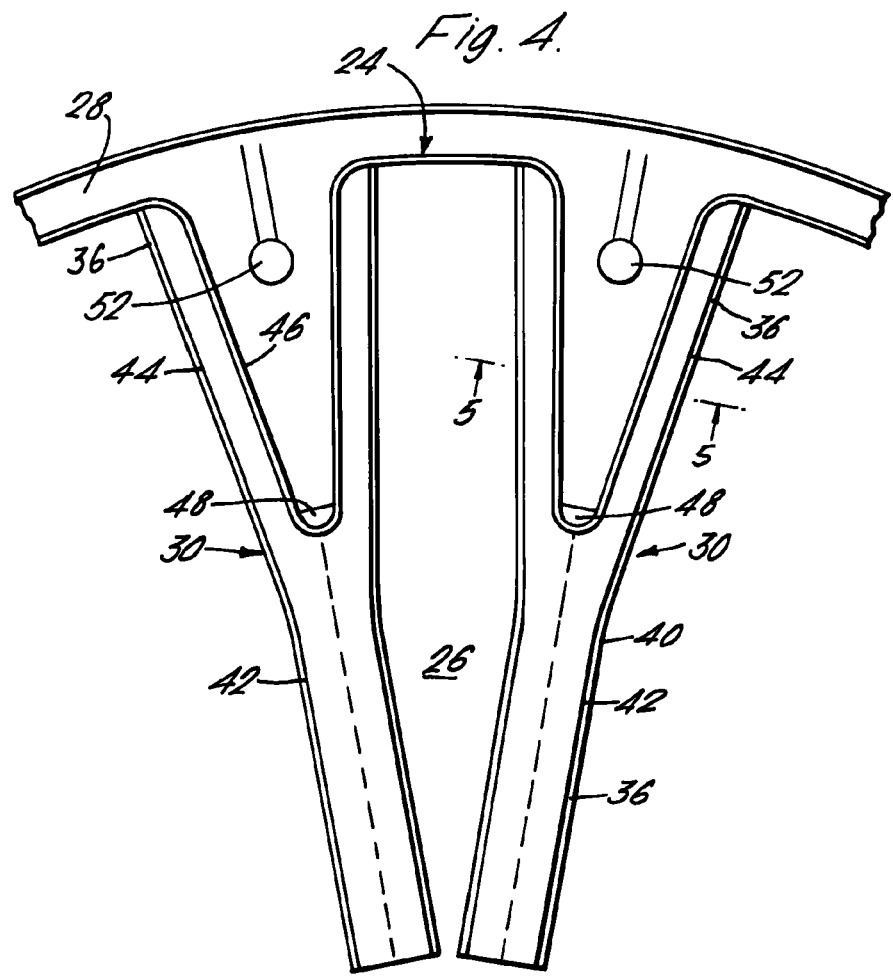
Figure 5:
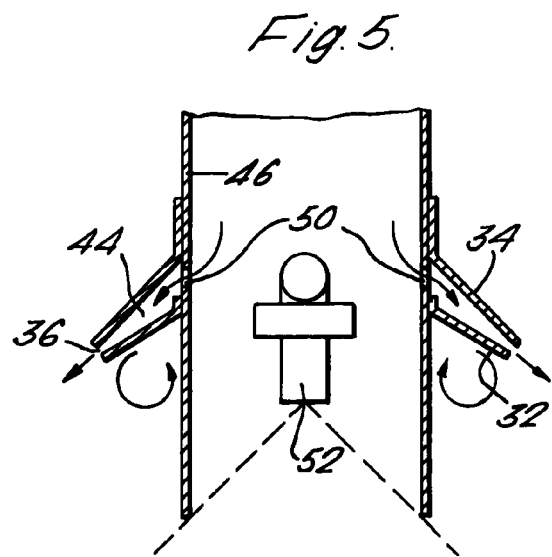

An embodiment of the invention will now be described by way of example only with reference to the accompanying drawings in which:

FIG. 1 is a schematic diagram of a gas turbine engine provided with a reheat system according to the invention, FIG. 2 is a perspective view of part of a gutter of the reheat system, FIG. 3 is a cross-sectional view of the part of a gutter shown in FIG. 2, FIG. 4 is a view of the reheat system taken from arrow 4 in FIG. 1, and FIG. 5 is a view from line 5-5 in FIG. 4.

In FIG. 1, there is shown a gas turbine engine comprising an air intake 10, a compressor 12, combustion equipment 14, a turbine 16, a jet pipe 18 and an exhaust nozzle 20.

Inside the jet pipe 18 is arranged a reheat system 22. The engine is of the by-pass type in which a portion of the air from the compressor by-passes the combustion equipment and the turbine, and rejoins the hot gases from the turbine in the jet pipe. To assist in the mixing of the gases, a mixer unit 24 is located in the jet pipe and this consists of a plurality of lobes, alternate lobes being arranged to direct hot gases from the turbine exhaust duct 26 and cold air from the by-pass duct 28 into the jet pipe 18.

In a modern high performance gas turbine engine, the temperature of the turbine exhaust gases can be in excess of 1000° K, and it is very difficult to provide a reheat system of gutters which can survive these temperatures. The temperature is reduced after the by-pass air has mixed with the turbine exhaust gases, but to locate the gutters in this region of cooler gases necessitates the provision of a relatively long jet pipe 18 with a consequent weight penalty.

To shorten the jet pipe 18 therefore, a plurality of gutters 30 are arranged radially within the mixer unit 24 in the turbine exhaust gas flow, the gutters having a substantially Y-shape. The radially inner portion 42 of each gutter consists of a channel-shaped flame stabilising portion 32, and a channel-shaped wall portion 34, the flame stabilising portion 32 being adapted to face downstream of the jet pipe. The portions 32 and 34 are secured together along their downstream edges by suitable means so as to leave narrow gaps or slots 36 along the secured downstream edges.

These hollow gutters, when in use, have their interiors supplied with cooling air from the by-pass duct 28 which air is deflected from the mixer unit lobes by deflector members 48 located at the radially outer ends of the portions 42. The cooling air then passes out of the gutters in a downstream direction through slots 36, this air also assisting in the promotion of vortices 38 adjacent to the flame stabilising portions 32, and improving the stability of the flames.

The radially outer portions 44 of the gutters divide and are secured to the walls 46 of the lobes of the mixer unit 24. Again they consist of a flame stabilising portion 32 and a wall portion 34 (see FIG. 5), but are supplied with cooling air through a plurality of holes 50 formed in the walls 46 of the lobes of the mixer unit 24. This air is discharged through the slots 36 as before, which continue along the length of each side of the portion 44 of each gutter.

Each radially outer portion 44 is thus half the width of the radially inner portion 42, and one half of the gutter comprises a portion of the wall 46 of the mixer unit 24. Only a single vortex is produced adjacent to the wall 46. Fuel is injected into the turbine exhaust gases immediately upstream of the radially inner portions 42 of the gutters, preferably in a direction so that atomised fuel flows between the gutters. Further injectors 52 are also provided in the by-pass air in the lobes of the mixer unit 24. These are adapted to supply fuel to the radially outer portions 44 of the gutters. The injectors 52 are preferably arranged adjacent the downstream ends of the lobes, but can be located slightly further upstream so that fuel spray issuing therefore impinges on the downstream ends of the wall 46, and assists in cooling this wall.

With this present invention, therefore, the gutters are arranged actually within the mixer unit 24 and the jet pipe 18 can therefore be made as short as possible and is therefore relatively light. The gutters are cooled to enable them to withstand the very high temperatures existing in the turbine exhaust gases within the mixer unit 24 in accordance with the co-pending application Ser. No. 886,070.

I claim:

1. A gas turbine engine of the by-pass type having a mixer for the turbine exhaust gases and the by-pass air, said mixer being of the lobed type, a reheat system for the further combustion of said turbine exhaust gases and by-pass air, said reheat system comprising a plurality of gutters, said gutters being arranged radially within the engine and extending from a position inwardly of said lobes of said mixer outwardly toward and into said lobes, a portion of a wall of each said lobe forming only a portion of each said gutter, and means for cooling said gutters at least inwardly of said lobes.

2. A gas turbine engine as claimed in claim 1 wherein in each said gutter comprises a radially inner part and a radially outer part, said radially inner part having a substantially channel-shaped section, and said radially outer part comprising a portion of said wall of said lobe and a portion of channel-shaped section.

3. A gas turbine engine of the by-pass type having a mixer for the turbine exhaust gases and the by-pass air, said mixer being of the lobed type, a reheat system for the further combustion of said turbine exhaust gases and by-pass air, said reheat system comprising a plurality of gutters, said gutters being arranged radially within the engine and extending into said lobes of said mixer, a portion of a wall of each said lobe forming at least a portion of each said gutter, each said gutter having a substantially Y-section, the two legs of the Y-section extending into adjacent lobes of said mixer and being attached to said walls of said lobes.

4. A gas turbine engine of the by-pass type having a mixer for the turbine exhaust gases and the by-pass air, said mixer being of the lobed type, a reheat system for the further combustion of said turbine exhaust gases and by-pass air, said reheat system comprising a plurality of gutters, said gutters being arranged radially within the engine and extending into said lobes of said mixer, a portion of a wall of each said lobe forming at least a portion of each said gutter, each said gutter consisting of a flame stabilising portion and a wall portion, said wall portion being spaced from said flame stabilising portion to define a space therebetween, cooling air being admitted to said space when the engine is in operation.

5. A gas turbine engine as claimed in claim 4 wherein a plurality of orifices are formed in said mixer to permit air to be admitted therethrough to said space between the portions of said radially outer part of each said gutter.

6. A gas turbine engine as claimed in claim 4 wherein said mixer unit is provided with a plurality of deflector members, said deflector members operable to deflect air into said space between said portions of said radially inner part of each said gutter.

* * * * *